US008560393B2

(12) United States Patent
Giordano et al.

(10) Patent No.: US 8,560,393 B2
(45) Date of Patent: Oct. 15, 2013

(54) INTERACTIVE INTERCHANGE RATE DECISIONING

(75) Inventors: Joseph A. Giordano, Waxhaw, NC (US); Elbert Lee Whitler, Webster Groves, MO (US); Herbert M. Fellman, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 633 days.

(21) Appl. No.: 12/491,433

(22) Filed: Jun. 25, 2009

(65) Prior Publication Data

US 2010/0250379 A1 Sep. 30, 2010

Related U.S. Application Data

(60) Provisional application No. 61/164,577, filed on Mar. 30, 2009.

(51) Int. Cl.
*G06Q 20/00* (2012.01)
(52) U.S. Cl.
USPC ............................................. 705/20; 705/44
(58) Field of Classification Search
USPC .......................................................... 705/20
See application file for complete search history.

(56) References Cited

U.S. PATENT DOCUMENTS

| 7,172,112 | B2 * | 2/2007 | Bonalle et al. ................ 235/379 |
| 7,775,426 | B2 * | 8/2010 | Paul et al. ...................... 235/379 |
| 7,870,065 | B2 * | 1/2011 | Gutierrez-Sheris ............ 705/39 |
| 2002/0165817 | A1 | 11/2002 | Rackson et al. |
| 2002/0188509 | A1 | 12/2002 | Ariff et al. |
| 2003/0061157 | A1 | 3/2003 | Hirka et al. |
| 2003/0093355 | A1 | 5/2003 | Issa |
| 2004/0153399 | A1 | 8/2004 | Wilkes |
| 2006/0136324 | A1 | 6/2006 | Barry et al. |
| 2007/0045407 | A1 | 3/2007 | Paul et al. |
| 2007/0051794 | A1 | 3/2007 | Glanz et al. |
| 2007/0174188 | A1 | 7/2007 | Fish |
| 2007/0233603 | A1 | 10/2007 | Schmidgall |
| 2008/0120194 | A1 | 5/2008 | Juras et al. |
| 2008/0120234 | A1 * | 5/2008 | Jagatic et al. .................. 705/44 |
| 2009/0030829 | A1 | 1/2009 | Chatter et al. |
| 2009/0112766 | A1 | 4/2009 | Hammad et al. |
| 2009/0119176 | A1 | 5/2009 | Johnson |
| 2009/0171796 | A1 | 7/2009 | Carroll et al. |
| 2010/0010905 | A1 | 1/2010 | Arzumanyan et al. |
| 2010/0036758 | A1 | 2/2010 | Monk |
| 2010/0161478 | A1 | 6/2010 | Cavanaugh et al. |

OTHER PUBLICATIONS

International Search Report for International Application PCT/US10/27765.
Patent Cooperation Treaty International Search Report, International Patent Application No. PCT/US2011/29332.
Patent Cooperation Treaty International Search Report, International Patent Application No. PCT/US2010/35724.
Durbin Credit/Debit Card Interchange Reform Amendments, downloaded on Apr. 4, 2012 from http://www.natoonline.org/pdfs/PDF%20Credit%20Card%20Interchange%20Fees/Durbin%20Amdts.

* cited by examiner

*Primary Examiner* — Garcia Ade
(74) *Attorney, Agent, or Firm* — Weiss & Arons LLP; Michael Springs (57) ABSTRACT

Apparatus and methods for providing transaction fee information to a customer. The apparatus and methods may provide to a customer at a merchant point of sale terminal information regarding a transaction fee. The transaction may be based on the customer's credit card or other purchasing instrument. The transaction fee may be imposed by an issuer of the credit card. The merchant may be required to pay the fee. The point of sale terminal may be configured to provide an opportunity for the customer to decide, based on the transaction fee, whether to continue the transaction or obtain information about fees associated with other credit cards.

14 Claims, 9 Drawing Sheets

INTERACTIVE INTERCHANGE RATE DECISIONING

CROSS-REFERENCE TO RELATED APPLICATION

This application claims the benefit of U.S. Provisional Patent Application No. 61/164,577, filed Mar. 30, 2009, entitled "INTERACTIVE INTERCHANGE RATE DECISIONING," which is hereby incorporated by reference herein in its entirety.

FIELD OF TECHNOLOGY

Aspects of the disclosure relate to providing apparatus and methods for selecting a transaction fee. In particular, the disclosure relates to apparatus and methods for selecting a transaction fee at a point of sale.

BACKGROUND

In a typical credit card transaction, a card holder purchases from a merchant or service provider ("the merchant") goods or services ("the goods") using credit. The credit is extended to the card holder by an issuing bank (the "issuer"). The merchant presents a debit to an acquiring bank (the "acquirer"). The acquirer pays the merchant for (and thus "acquires") the goods. A network in communication with the issuer and the acquirer settles the transaction between the issuer and the acquirer. The network may collect network fees from the issuer and the acquirer in connection with the settlement.

The issuer may impose upon the acquirer a fee for participating in the transaction. The fee may be referred to as "interchange." Interchange may be a fixed fee for the transaction or a percentage of the transaction. Interchange flows from the acquirer, through the network, to the issuer. The issuer typically uses interchange to cover costs of acquiring credit card customers, servicing credit card accounts, providing incentives to retain customers, mitigating fraud, covering customer credit risk, group comp and other expenses.

The acquirer may deduct a "transaction fee" from the amount that the acquirer pays the merchant in exchange for the goods. The transaction fee may cover the acquirer's network fee, interchange, and other expenses. The acquirer may obtain a profit from the transaction fee.

Figure 1:
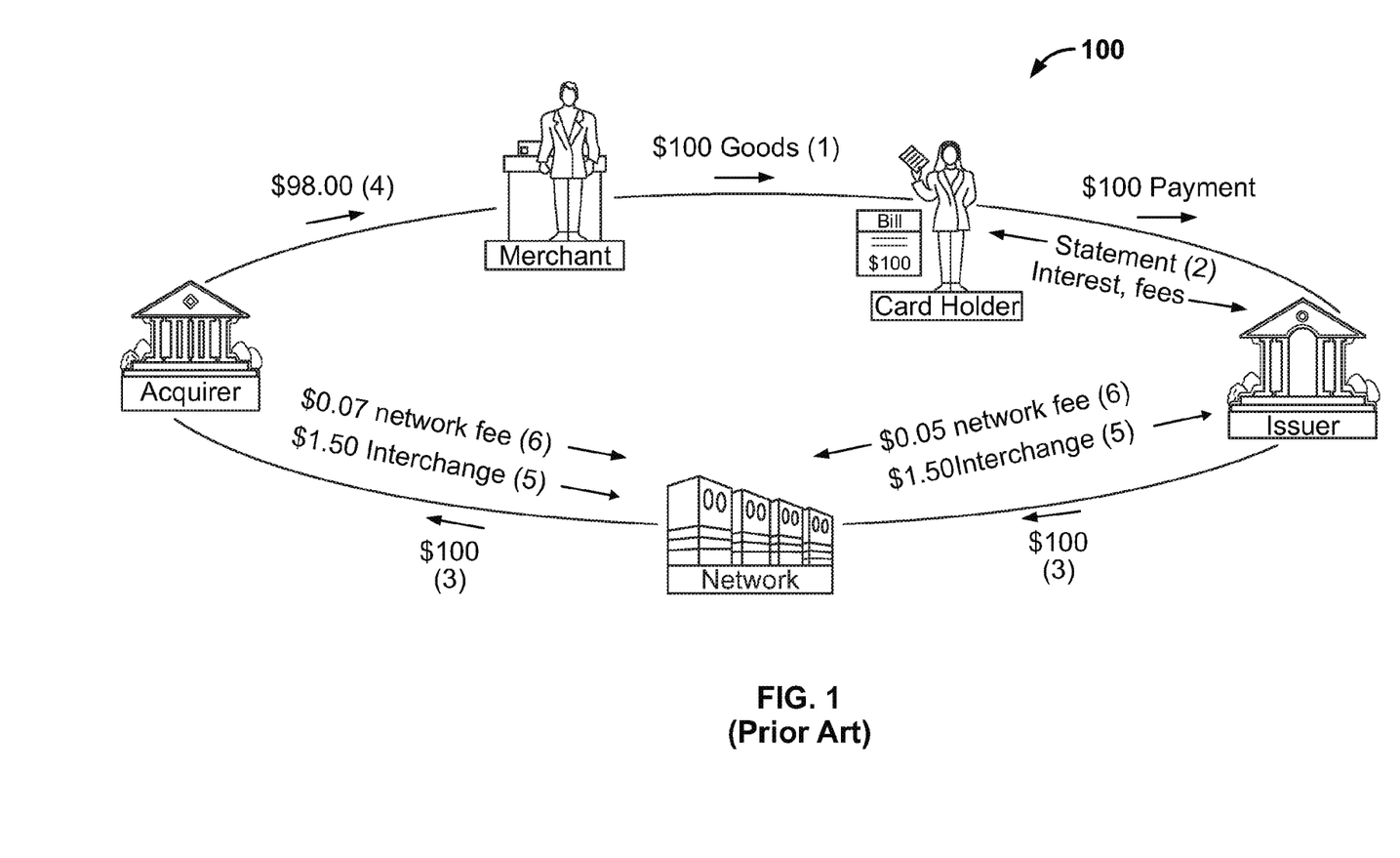
FIG. 1 shows a prior art process.

FIG. 1 shows typical credit card transaction settlement flow 100. At step 1, the merchant provides $100 in goods to the card holder. The card holder pays with a credit card. At step 2, the issuer transmits to the card holder a statement showing the purchase price ($100.00) due. The issuer collects the purchase price amount, along with interest and fees if appropriate, from the card holder. At step 3, the issuer routes the purchase price amount ($100.00) through the network to the acquirer. At step 4, the acquirer partially reimburses the merchant for the purchase price amount. In the example shown in FIG. 1, the partial reimbursement is $98.00. The difference between the reimbursement amount ($98.00) and the purchase price amount ($100.00) is a two dollar ($2.00) transaction fee.

At step 5, the acquirer pays an interchange amount ($1.50), via the network, to the issuer. At step 6, both the acquirer and the issuer pay a network fee ($0.07 for acquirer and $0.05 for the issuer) to the network.

The net profits of the parties to settlement flow 100 are shown in Table 1.

TABLE 1

Net positions, by party, based on settlement flow 100 (shown in FIG. 1).

| Party | Net ($) |
|---|---|
| Issuer | 1.45 |
| Acquirer | 0.43 |
| Network | 0.12 |
| Merchant | −2.00 |

In settlement 100 (shown in FIG. 1), the transaction fee is based on a merchant discount rate of 2%. The $1.50 interchange is based on an interchange rate of 1.5%. The sum of the network fees ($0.07 and $0.05) is based on a total network fee rate of 12%.

Networks offered under the trademarks VISA, MASTERCARD, NYCE and PULSE are known. Networks typically set interchange rates. Interchange rates often depend for each network on merchant type and size, transaction processing method and other factors. Some networks set rules that prohibit merchants from charging an incremental fee for credit card payments, establishing minimum or maximum purchase price amounts or refusing to accept selected cards. Table 2 shows benefits of settlement flow 100 (shown in FIG. 1).

| Party | Benefit |
|---|---|
| Merchant | Access to card holder funds and credit |
| | Timely settlement |
| | Protection from customer fraud and credit risk |
| | Increased purchase price amounts |
| Issuer | Reliable payment platform with broad acceptance |
| | Consistent customer experience across merchants |
| | Predictable source of revenue to support card issuance costs |
| Card holder | Access to ready funds and credit |
| | Ability to make purchases virtually anywhere |
| | Protection from fraud |
| | Protection from merchant disputes |
| | Reward for card based purchases |

The merchant is often prohibited from directly passing the transaction fee along to the card holder. Nevertheless, the transaction fee increases the merchant's operating expenses and causes the prices of the merchant's goods to increase. If the merchant and the card holder could share information about the transaction fee, the merchant's expenses may decrease. Some or all of the savings could be shared with the card holder. POS apparatus, however, are not configured to provide the card holder with such information. Therefore, the card holder is unable to evaluate the affect on goods prices of the use of a credit card. Also there, is currently no way for the merchant and the card holder to share the transaction fee.

It would be desirable, therefore, to provide apparatus and methods for providing a card holder with transaction fee information at a point of sale.

It also would be desirable, therefore, to provide apparatus and methods for a card holder to select a transaction fee offer at a point of sale.

SUMMARY OF THE INVENTION

Apparatus and methods for providing transaction fee information to a customer are provided. The apparatus and methods may involve receiving a transaction data object, identifying a transaction fee based on the transaction data object, and transmitting a transaction fee data object to a point of sale platform, the transaction fee data object comprising the transaction fee information.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Apparatus and methods for providing transaction fee information to a customer are provided.

The apparatus and methods may enable merchants to pass along interchange costs or to provide incentives to the customer at a point of sale ("POS"). The customer may then decide which card or payment mechanism to use. For example, the customer may choose to use a credit card that results in the lowest transaction cost. The customer may choose a credit card that provides incentives (cash back, cash rewards, non-cash rewards, benefits etc.). The incentives may be accruable.

The POS will be illustrated herein in the context of a retail cash register check-out station, but embodiments of the invention may include other payment contexts. For example, the apparatus and methods may be implemented in the contexts of: a telephone connection between the customer and a merchant representative; a telephone connection between the customer and a merchant interactive voice response ("IVR") system; or a client-server exchange or session in which the client may include a processor, transmitter and receiver. The client may be mobile, handheld or stationary (as in a desktop personal computer).

In some embodiments, the apparatus and methods may provide the customer with different transaction cost alternatives based on knowledge about the customer's "wallet" (banking and credit relationships with issuers). The apparatus and methods may involve rules that may be applied to transaction information to suggest a payment method to the customer. The rules may be set up by one or more of the merchant, the apparatus, the customer or any other suitable party.

The apparatus and methods may be consistent with the current 4-party (merchant/issuer/network/acquirer) settlement system. In some embodiments, the apparatus and methods may be consistent with only a portion of the 4-party system. In some embodiments, the apparatus and methods may be consistent with other settlement systems.

The apparatus and methods may involve receiving a transaction data object that corresponds to a transaction between a customer and a merchant. The transaction may take place using a POS terminal. The apparatus and methods may identify a transaction fee based on the transaction data object. The transaction fee may be identified using, for example, one or more lookup tables. The lookup tables may map one or more transaction fee factors to one or more transaction fees.

The apparatus and methods may transmit a transaction fee data object to the POS terminal. The transaction fee data object may include transaction fee information. The POS terminal may display some or all of the transaction fee information to the customer.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 2:
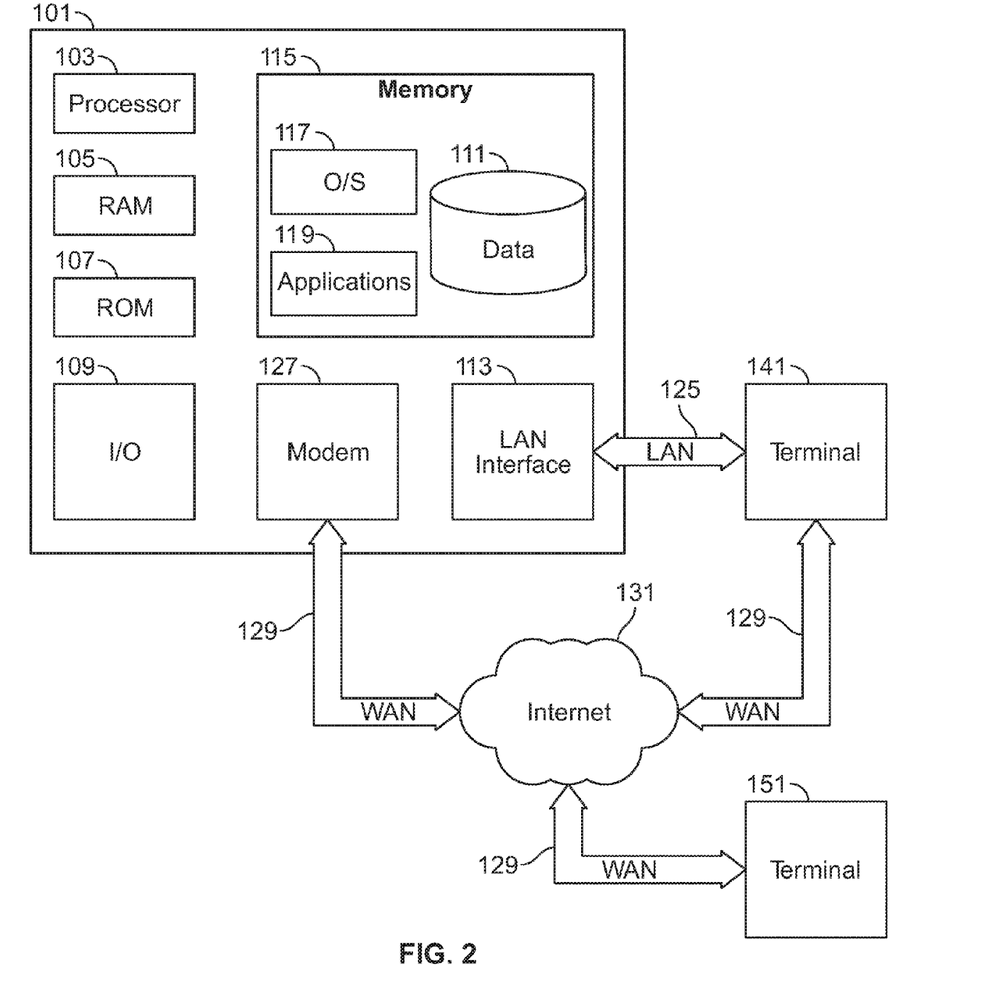
FIG. 2 shows apparatus that may be used in accordance with the principles of the invention.

FIG. 2 is a block diagram that illustrates a generic computing device 201 (alternatively referred to herein as a "server") that may be used according to an illustrative embodiment of the invention. The computer server 201 may have a processor 203 for controlling overall operation of the server and its associated components, including RAM 205, ROM 207, input/output module 209, and memory 225.

Input/output ("I/O") module 209 may include a microphone, keypad, touch screen, and/or stylus through which a user of device 201 may provide input, and may also include one or more of a speaker for providing audio output and a video display device for providing textual, audiovisual and/or graphical output. Software may be stored within memory 225 and/or storage to provide instructions to processor 203 for enabling server 201 to perform various functions. For example, memory 225 may store software used by server 201, such as an operating system 217, application programs 219, and an associated database 221. Alternatively, some or all of server 201 computer executable instructions may be embodied in hardware or firmware (not shown). As described in detail below, database 221 may provide storage for customer information, transaction information, merchant information, transaction fee information, transaction fee factors and any other suitable information.

Server 201 may operate in a networked environment supporting connections to one or more remote computers, such as terminals 241 and 251. Terminals 241 and 251 may be personal computers or servers that include many or all of the elements described above relative to server 201. The network connections depicted in FIG. 2 include a local area network (LAN) 225 and a wide area network (WAN) 229, but may also include other networks. When used in a LAN networking environment, computer 201 is connected to LAN 225 through a network interface or adapter 223. When used in a WAN networking environment, server 201 may include a modem 227 or other means for establishing communications over WAN 229, such as Internet 231. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 219, which may be used by server 201, may include computer executable instructions for invoking user functionality related to communication, such as email, short message service (SMS), and voice input and speech recognition applications.

Computing device 201 and/or terminals 241 or 251 may also be mobile terminals including various other components, such as a battery, speaker, and antennas (not shown).

Terminal 251 and/or terminal 241 may be portable devices such as a laptop, cell phone, blackberry, or any other suitable device for storing, transmitting and/or transporting relevant information.

Any information described above in connection with database 221, and any other suitable information, may be stored in memory 225.

One or more of applications 219 may include one or more algorithms that may be used to determine or select a transaction fee, apply a transaction fee offer rule, drive a POS platform graphical user interface and perform any other suitable tasks related to providing transaction fee information to a customer.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like. In a distributed computing environment, devices that perform the same or similar function may be viewed as being part of a "module" even if the devices are separate (whether local or remote) from each other.

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network. In a distributed computing environment, program modules may be located in both local and remote computer storage media including memory storage devices.

Figure 3:
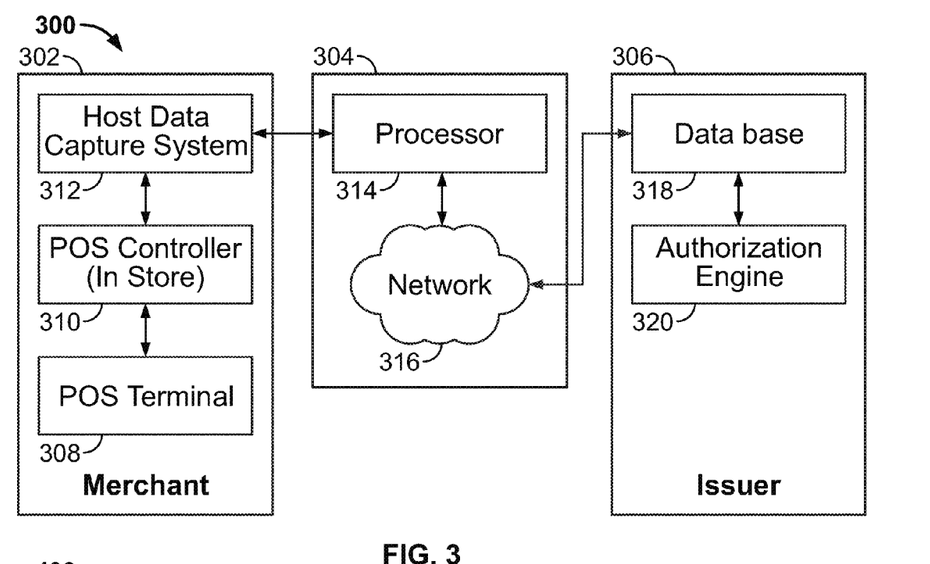
FIG. 3 shows other apparatus in accordance with the principles of the invention.
Figure 4:
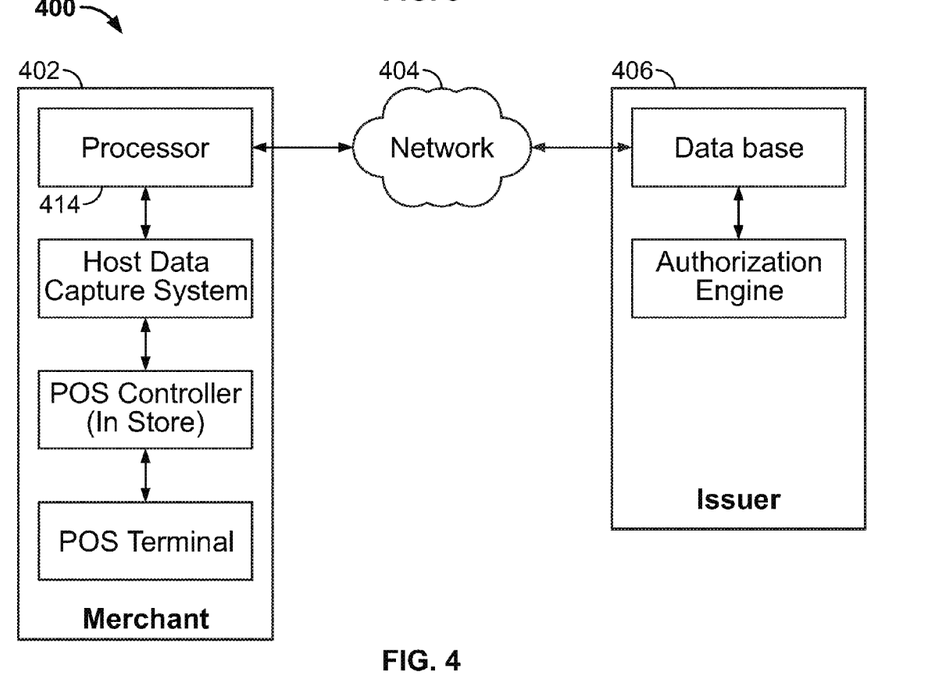
FIG. 4 shows yet other apparatus in accordance with the principles of the invention.

FIGS. 3 and 4 show illustrative systems for processing and communicating transaction fee information. One or more of the elements shown in FIGS. 3 and 4 may include one or more of the elements or features shown and described in connection with FIG. 2.

FIG. 3 shows illustrative system 300 for processing and communicating transaction fee information. System 300 may include merchant component 302, network component 304 and issuer component 306. In general, a system such as 300 may include many merchant components such as 302 and many issuer components such as 306.

A customer may purchase goods by transferring customer information from a personal data storage device, such as a credit card, to POS terminal 308. POS terminal 308 may read the customer information from the card. The customer information may include issuer information, account information and any other suitable information.

POS terminal 308 may transmit transaction information to POS controller 310. The transaction information may include some or all of the customer information and any other suitable information, such as the transaction amount and information regarding the purchased goods.

POS controller 310 may act as a server for providing user prompts and display layout information to one or more POS terminals such as POS terminal 308. POS controller 310 may receive transaction information from one or more of the POS terminals.

POS controller 310 may transmit the transaction information to host data capture system 312. Host data capture system 312 may store transaction information from POS controller 310. Host data capture system 312 may store accounting data, inventory data and other suitable data that may be included in the transaction information.

Host data capture system 312 may route merchant information to processor 314. Processor 314 may include a credit card network "processor," which is known to those of ordinary skill in the art. The illustrative systems shown in FIGS. 3 and 4 may include one or more other processors that perform tasks that are appropriate for the components thereof. The merchant information may include some or all of the transaction information. The merchant information may include information about the merchant, the merchant's business, the merchant's network membership, the merchant's business behavior and any other suitable information. Processor 314 may route some or all of the merchant information, via network 316, to database 318. The routing may be governed by transaction information. For example, the routing may be governed by a bank issuer number ("BIN") that is encoded in the customer's credit card. Authorization engine 320 may render a transaction authorization decision based on the merchant information.

Authorization engine 320 may transmit authorization information back to POS terminal 308 through network 316, processor 314, host data capture system 312 and POS controller 310. The authorization information may include the authorization decision (e.g., "GRANTED" or "DENIED"). The authorization information may include some or all of the merchant information. The merchant information may be used by processor 314 to route the authorization information back to the merchant and the POS terminal where the customer is present.

Transaction fee information may include some or all of the information that is necessary to identify the transaction fee for the transaction. The transaction fee may depend on one or more transaction fee factors, such as interchange rate, network rates, merchant type, merchant size, transaction processing method, and any other suitable factors. Transaction fee information may include one or more of the foregoing factors and any other suitable factors.

The transaction fee information may be stored in any suitable element of merchant component 302, network component 304 and issuer component 306. For example, transaction fee information may be stored in processor 314. Processor 314 may include algorithms that may be used in conjunction with the transaction fee information to identify the transaction fee corresponding to the customer transaction taking place at POS terminal 308. After the transaction fee is identified, processor 314 may transmit the transaction fee, via merchant components 302, to POS terminal 308. POS terminal 308 may display the transaction fee for viewing by the customer.

POS terminal may have one or more interactive features that the customer may use. The features may provide the customer with information that may help the customer decide whether to execute the transaction. The customer may use the features to obtain more information about the merchant, the transaction, the transaction fee, transaction fees associated with different purchasing instruments (e.g., credit cards, debit cards, instruments or devices that include a contact chip, such as an ISO14443-compliant contactless chip, or other electronic purchasing devices) or other suitable information.

Purchasing instruments may store data in a magnetic strip, a bar code, a silicon chip or any other suitable data storage device or format.

FIG. 4 shows illustrative system 400 for processing and communicating transaction fee information. System 400 may include merchant component 402, network component 404 and issuer component 406. In general, a system such as 400 may include many merchant components such as 402 and many issuer components such as 406. System 400 may have one or more of the features that are described herein in connection with system 300.

In system 400, processor 414 may be present in merchant component 402. Corresponding processor 314 is present in network component 304 (shown in FIG. 3). Systems such as 300 are designed for merchants that require high throughput of merchant information and transaction fee information. Systems such as 400 are designed for merchants that do not require high throughput of merchant information and transaction fee information.

Figure 5:
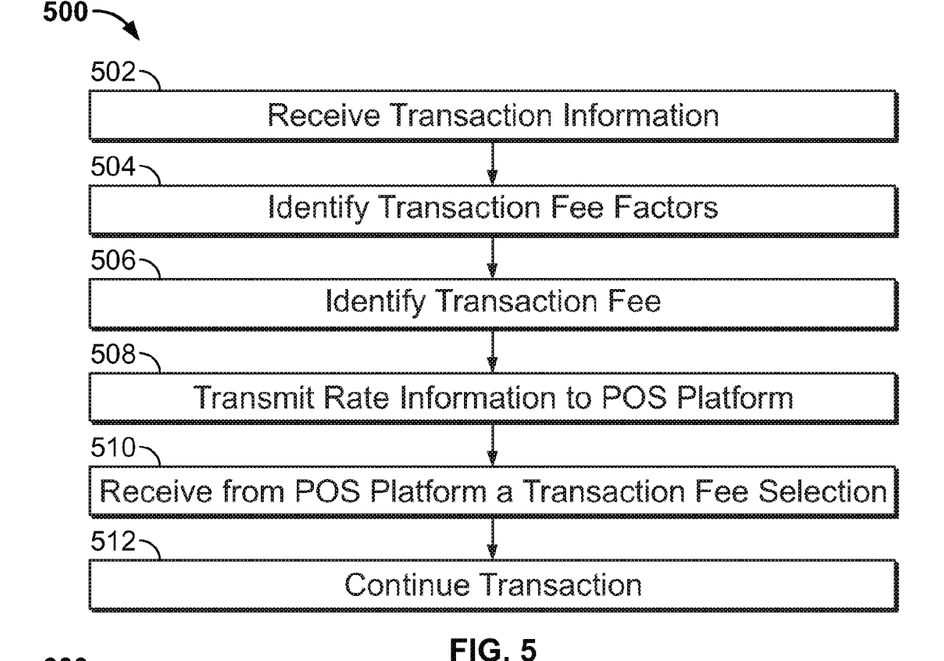
FIG. 5 shows a process in accordance with the principles of the invention.
Figure 6:
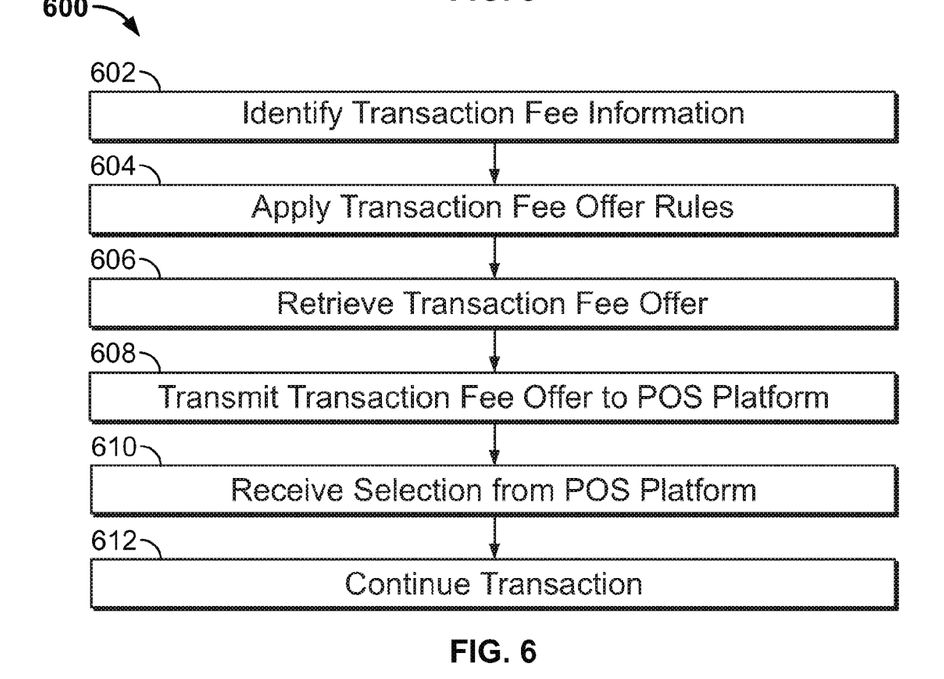
FIG. 6 shows another process in accordance with the principles of the invention.

Processes in accordance with the principles of the invention may include one or more features of the process illustrated in FIGS. 5-6. For the sake of illustration, the steps of the process illustrated in FIG. 2 will be described as being performed by a "system". The "system" may include one or more of the features of the apparatus that are shown in FIGS. 1-2 and/or any other suitable device or approach. The "system" may be provided by an entity. The entity may be an individual, an organization or any other suitable entity.

FIG. 5 shows illustrative process 500 for providing transaction fee information to a customer. The customer may be a participant in a transaction for which another participant, such as a merchant, for example, is to pay some or all of the transaction fee. Process 500 may begin at step 502. At step 502, the system may receive transaction information. For example, the system may receive transaction information from a POS platform such as POS terminal 308 (shown in FIG. 3). At step 504, the system may use the transaction information to identify transaction fee factors.

At step 506, the system may identify the transaction fee based on the transaction fee factors. At step 508, the system may transmit the transaction fee to the POS platform.

At step 510, the system may receive from the POS platform a transaction fee selection. The transaction fee selection may be selected by the customer. The customer may select the transaction fee after viewing the transaction fee using the POS platform. In some embodiments, the POS platform may provide the customer with two or more transaction fees corresponding to two or more different purchasing instruments. The customer may choose one of the purchasing instruments for execution of the transaction.

At step 512, the transaction may continue with further processing by one or more of merchant components such as 304, network components such as 306 and issuer components such as 308 (shown in FIG. 3).

FIG. 6 shows illustrative process 600 for providing transaction fee information to a customer. The customer may be a participant in a transaction for which another participant, a merchant, for example, is to pay some or all of the transaction fee. Process 600 may begin at step 602. At step 602, the system may identify one or more transaction fees associated with one or more purchasing instruments. At step 604, the component may apply transaction fee offer rules to select a merchant offer. The merchant offer may be an offer by the merchant to the customer. The merchant offer may offer the customer value in exchange for the selection of a purchase instrument or transaction fee.

For example, the merchant may offer the customer a discounted purchase price for the selection of an identified credit card. The system may include a device that the merchant may use to store one or more offers. The merchant may use the device to establish or select offer rules. For example, a rule may state, approximately: "IF THE TRANSACTION FEE IS LESS THAN 1% OF THE PURCHASE PRICE, OFFER THE CUSTOMER 5 REWARD POINTS." Other suitable rules may be included.

At step 606, the system may retrieve a transaction fee offer.

At step 608, the system may transmit the transaction fee offer to the POS platform.

At step 610, the system may receive from the customer, via the POS platform, a transaction fee selection. The transaction fee selection may include an acceptance of the transaction fee offer.

At step 612, the transaction may continue with further processing by one or more of merchant components such as 304, network components such as 306 and issuer components such as 308 (shown in FIG. 3).

FIGS. 7-15 show illustrative views that may be presented by a POS platform such as POS terminal 308 (shown in FIG. 3) to a customer during a transaction. The POS platform may display one or more of the views in any suitable sequence. The POS platform may display suitable views that are not shown herein in connection with or separate from the views shown in FIGS. 7-15.

It will be appreciated that, in embodiments in which the POS includes a telephone session between a customer service representative of the merchant and the customer, information corresponding to the information in FIGS. 7-15 may be provided to the customer service representative for conveyance by voice to the customer. In embodiments in which the POS includes an IVR system for executing transactions by telephone, the information shown in FIGS. 7-15 may be transmitted by audio signals. Responses to the information may be received from the customer as audio signals.

Some embodiments may include a sequence of views that include those shown in FIGS. 7-10.

Figure 7:
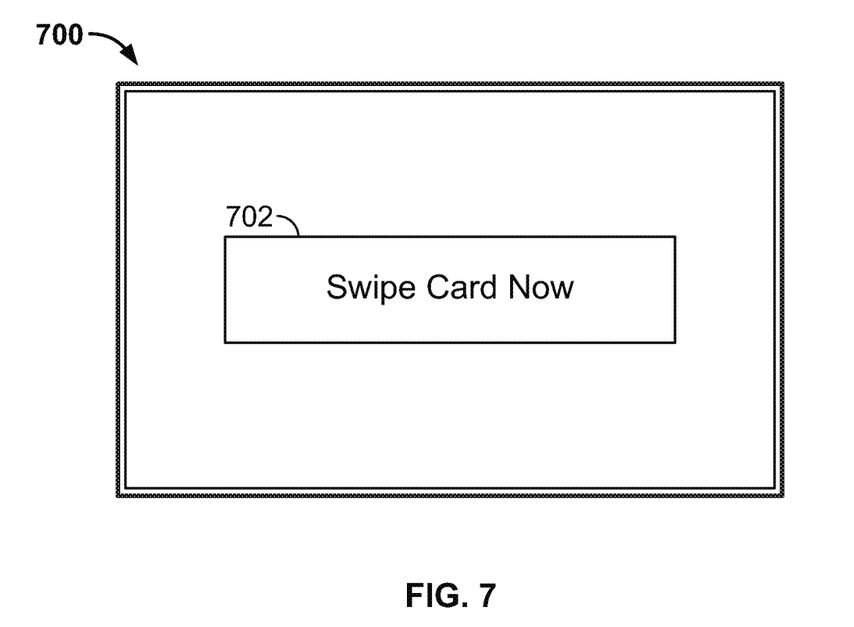
FIG. 7 shows still other apparatus in accordance with the principles of the invention.

FIG. 7 shows view 700. View 700 may include text 702 that instructs the customer to swipe a card at a POS platform such as POS terminal 308 (shown in FIG. 3).

Figure 8:
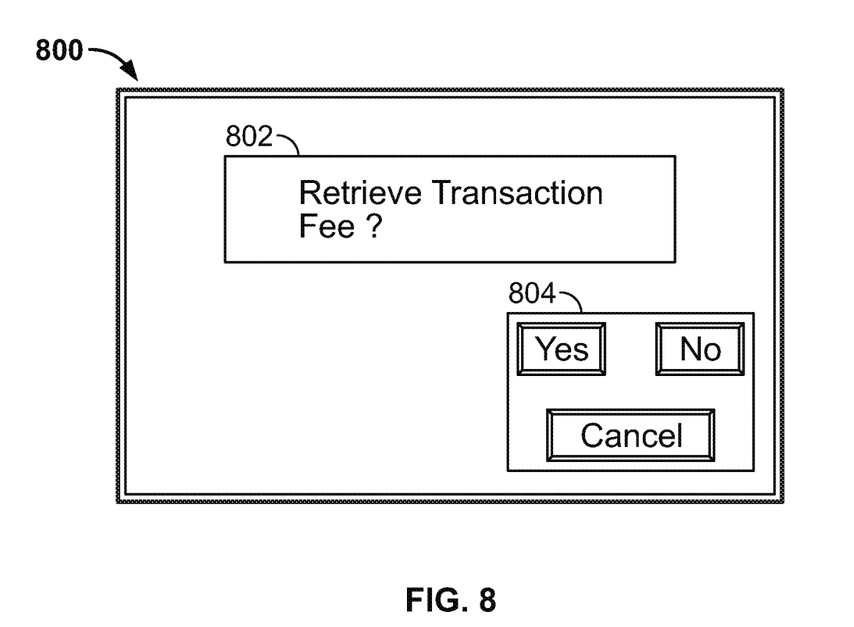
FIG. 8 shows still other apparatus in accordance with the principles of the invention.

FIG. 8 shows view 800. View 800 may include text 802 that asks the customer if the customer would like to view the transaction fee associated with the transaction based on the swiped card. View 800 may include user controls 804 that the customer may use to respond to text 802 or cancel the transaction.

Figure 9:
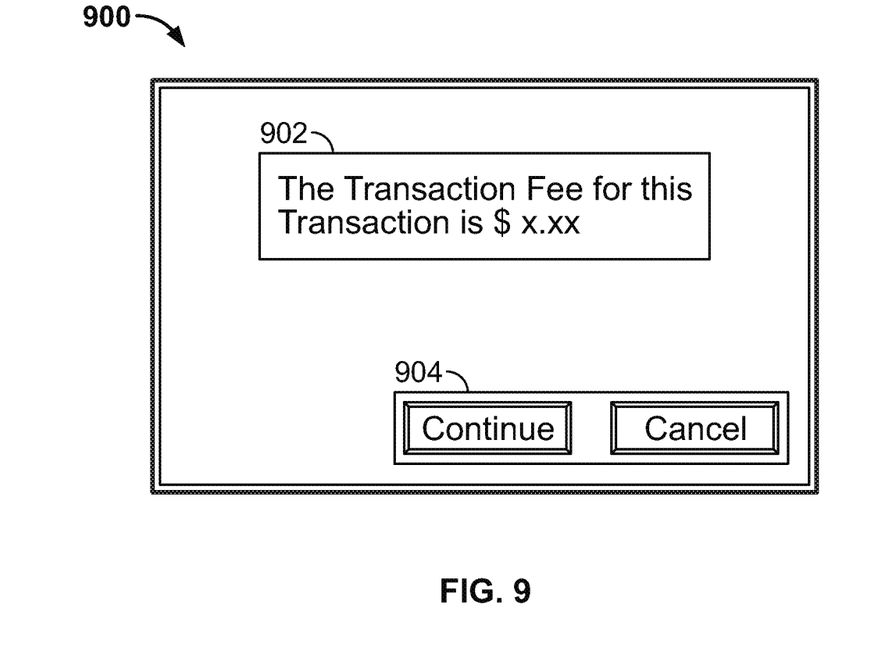
FIG. 9 shows still other apparatus in accordance with the principles of the invention.

FIG. 9 shows view 900. View 900 may include text 902 that displays the transaction fee to the customer. View 900 may include user controls 904 that the customer may use to continue or cancel the transaction.

Figure 10:
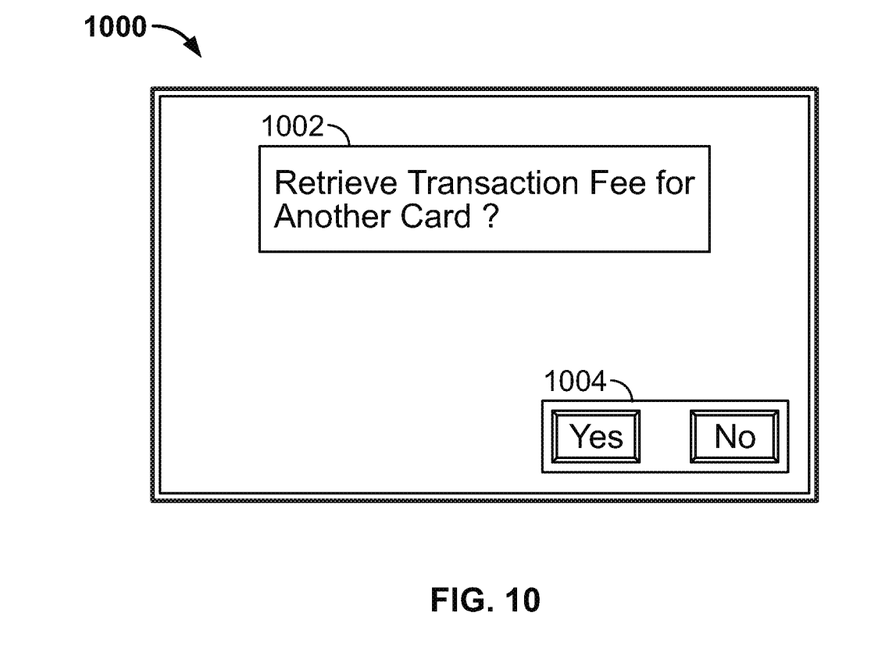
FIG. 10 shows still other apparatus in accordance with the principles of the invention.

FIG. 10 shows view 1000. View 1000 may include text 1002 that asks the customer if the customer would like to view a transaction fee that would be associated with the transaction based on use of a different card. View 1000 may include user controls 1004 that customer may use to respond to text 1002.

If the customer responds affirmatively to text 1002, the POS platform may prompt the customer to swipe the different card.

Figure 11:
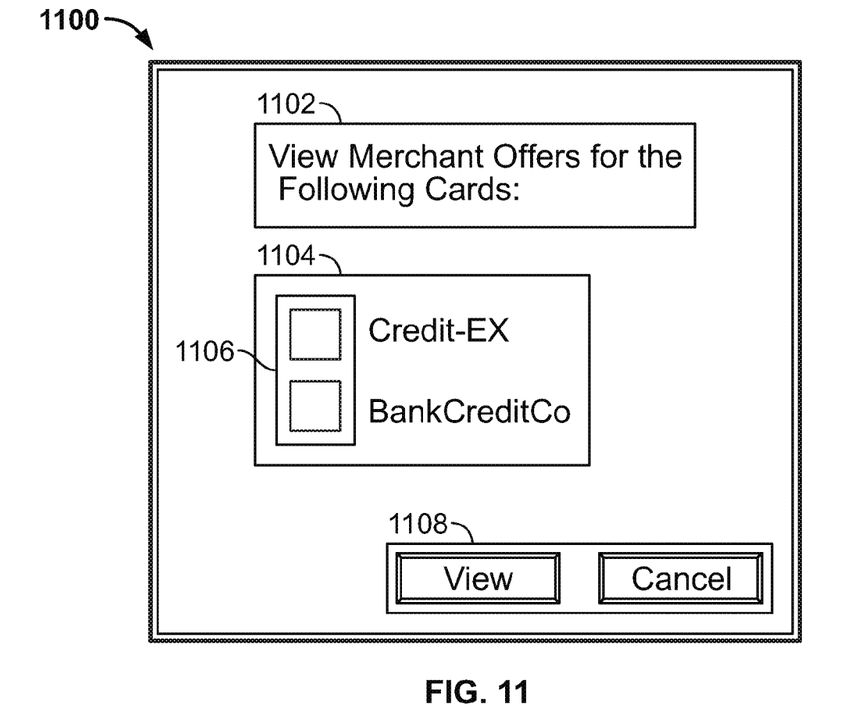
FIG. 11 shows still other apparatus in accordance with the principles of the invention.
Figure 12:
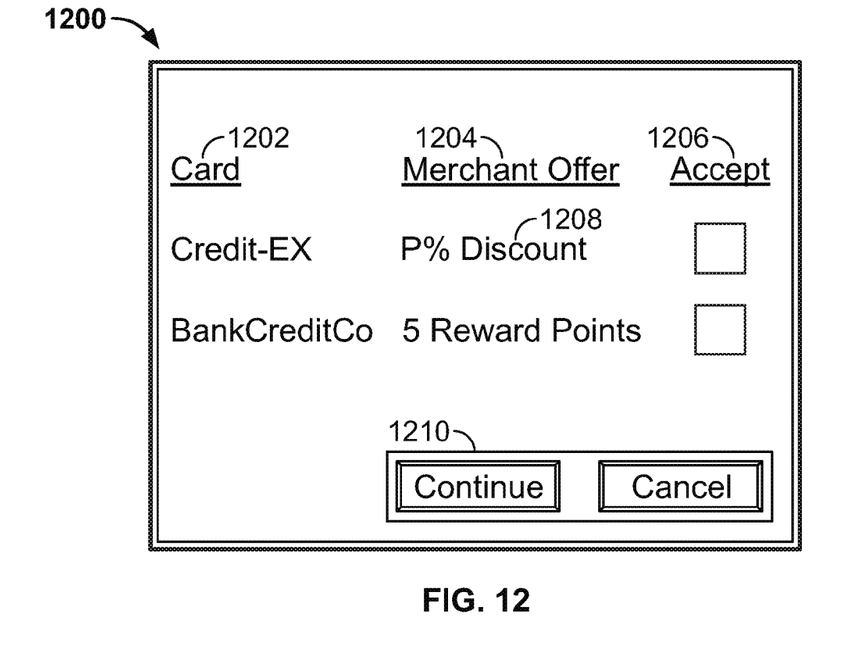
FIG. 12 shows still other apparatus in accordance with the principles of the invention.

Some embodiments may include a sequence of views that include those shown in FIGS. 11-12.

FIG. 11 shows view 1100. In view 1100, the POS platform may identify one or more cards from which the customer may choose to view transaction fees. The POS platform may identify the cards in any suitable manner. For example, the POS platform may identify cards that the customer has previously presented to the merchant.

In some embodiments, the POS platform may identify cards that the customer has identified for the merchant. For example, the customer may inform the merchant about cards that the merchant should record for the purpose of views such as 1100. The POS platform may identify cards that the customer carries based on information received from the cards' issuers. (The issuers may obtain appropriate authorization from the card holders to do so.)

In some embodiments, the POS platform may identify the cards based on data received from a merchant affinity card. The merchant affinity card may identify the customer as a member of the merchant's affinity program. The membership may entitle the customer to discounts or other benefits. The merchant may store in the affinity card identification information about purchasing instruments that the customer holds. For example, the POS platform may prompt the customer to swipe the affinity card to provide the POS platform with identification information about the purchasing instruments. The POS platform may then provide the customer with transaction fees associated with the purchasing instruments.

View 1100 may include text 1102 that invites the customer to view one or more merchant offers in connection with one or more cards. Text 1102 states that the customer may select one or more cards, from list 1104, for which the system will display merchant offers. The merchant offers may include offers that the merchant may have selected to provide the customer with incentives or disincentives regarding the choice of the cards in list 1104. List 1104 may include check boxes 1106 that the customer may use to check one or more cards for which to view merchant offers.

View 1100 may include user controls 1108 that the customer may use to instruct the POS platform to display transaction fees or cancel the transaction.

FIG. 12 shows view 1200. View 1200 may include card list 1202, merchant offer list 1204 and "accept" check boxes 1206. The customer may use one of check boxes 1206 to accept a corresponding one of merchant offers 1204. Merchant offers 2104 may include, for example, P % discount 1208. P may be a number that is chosen to incentivize or disincentivize the customer regarding a choice of corresponding CREDIT-EX in list 2102. In this manner, the merchant may share with the customer a portion of a benefit of a lower transaction fee, should the customer choose the card corresponding to the lower transaction fee.

View 1200 may include user controls 1210 that the customer may use to instruct the POS platform to continue or cancel the transaction.

Figure 13:
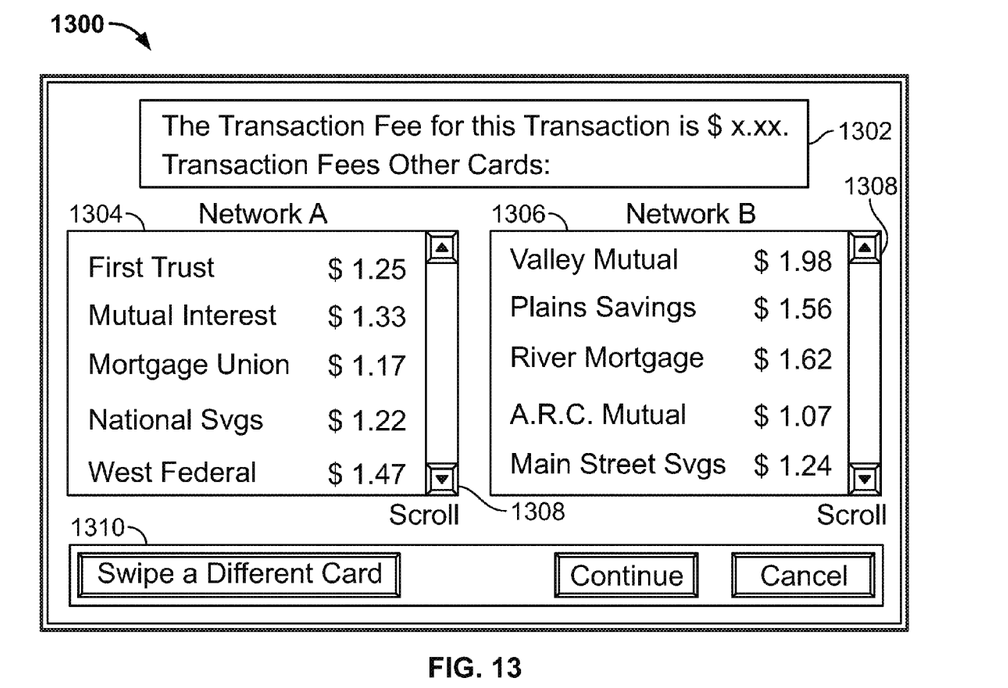
FIG. 13 shows still other apparatus in accordance with the principles of the invention.

FIG. 13 shows view 1300. View 1300 may be used in any appropriate sequence. In some embodiments, view 1300 may be used, for example, after a view such as 1000 (shown in FIG. 10).

View 1300 may be displayed to a customer after the customer swipes a card. View 1300 may include text 1302 that may inform the customer that the transaction fee associated with the transaction and the swiped card is "$X.XX." Text 1302 may introduce transaction fees for other cards that may be associated with one or more networks, such as Network A and Network B. View 1300 may include lists 1304 and 1306 that correspond to Networks A and B, respectively. Lists 1304 and 1306 may include credit card issuer names and corresponding transaction fees. Control 1306 and 1308 may be used to scroll through lists 1304 and 1306, respectively.

The customer may select one of the items in lists 1304 and 1306 to identify to the POS platform that the customer will swipe the card corresponding to the selected item. View 1300 may include controls 1310 to configure the POS platform to receive a swipe from a different card, continue a transaction in progress or cancel the transaction.

In some embodiments, one or more of lists 1304 and 1306 may be a list of merchandise categories, a list of card categories or a list of any other transaction fee factors.

Figure 14:
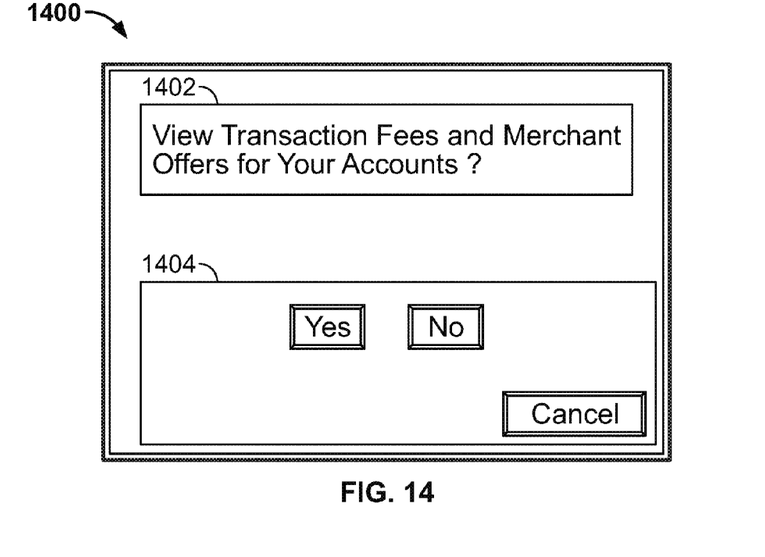
FIG. 14 shows still other apparatus in accordance with the principles of the invention.

FIG. 14 shows view 1400. View 1400 may be displayed to a customer before the customer swipes a card. For example, view 1400 may be displayed prior to the display of view 700 (shown in FIG. 7). View 1400 may include text 1402 that may inquire whether the customer would like to view transaction fees and merchant offers based on cards that the customer holds. View 1400 may include user controls 1404 to respond to the question in text 1402.

Figure 15:
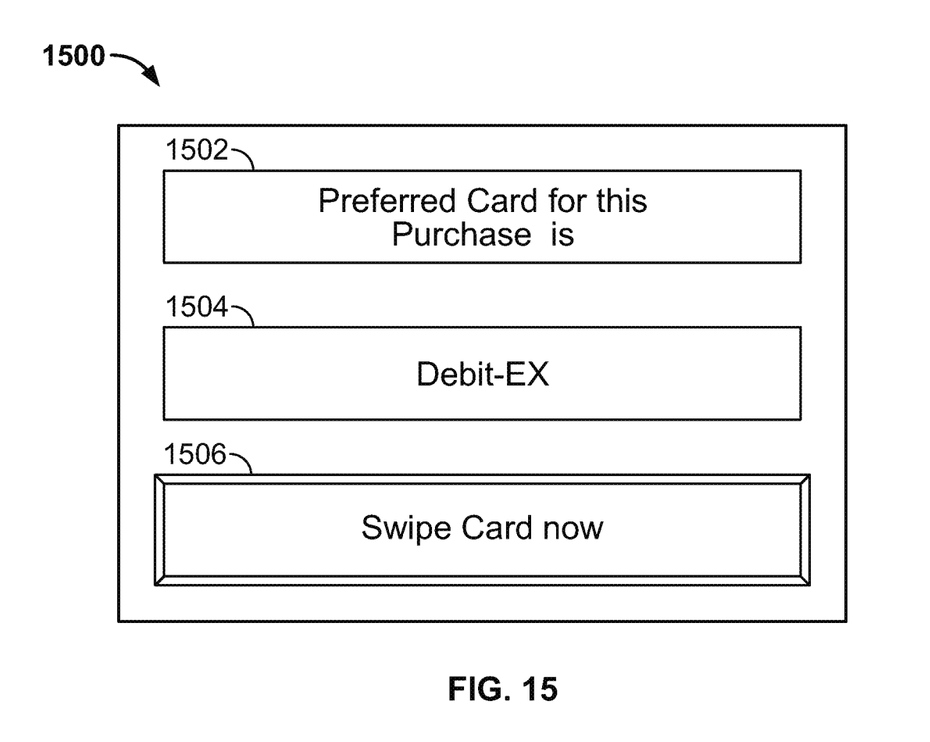
FIG. 15 shows still other apparatus in accordance with the principles of the invention.

FIG. 15 shows view 1500. View 1500 may be displayed to a customer in connection with a suggestion to the customer to use a particular card for the transaction. The suggestion may be provided by the merchant. In connection with the suggestion, the merchant may act independently of, or in conjunction with, the issuer and/or the acquirer. The suggestion may be based on one or more rules. The suggestion may be based on items that the customer has presented for purchase. The suggestion may be based on knowledge about the customer, the customer's wallet, the customer's initial selection of a card for the transaction or any other suitable information.

Text 1502 may inform the customer that there is a suggested or preferred card for the transaction. Text 1504 may identify the suggested or preferred card. The suggested or preferred card may be identified as described above. Text 1506 may include a graphical user interface control that provides the customer with an opportunity to indicate that the customer is ready to swipe a card.

In some embodiments, view 1500 may inform the customer that the customer may swipe the preferred card or another card. Apparatus such as that shown and described in connection with FIGS. 2-4 may be used to execute the transaction based on a swiping of the preferred card or a different card.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for providing transaction fee information to a customer have been provided. Persons skilled in the art will appreciate that the present invention can be practiced by other than the described embodiments, which are presented for purposes of illustration rather than of limitation. The present invention is limited only by the claims that follow.

What is claimed is:

1. A method for providing transaction fee information to a customer, the method comprising:
   using a receiver module in communication with an electronic communication network, receiving a transaction data object;
   using a processor module in communication with the receiver, identifying a transaction fee based on the transaction data object; and
   using a transmitter module in communication with the electronic communication network, transmitting to the customer at a point of sale platform a transaction fee data object that comprises the transaction fee information.

2. The method of claim 1 further comprising, when the transaction data object is a first transaction data object, receiving, using the receiver module, a second transaction data object, the second transaction data object including a transaction fee selection.

3. The method of claim 1 further comprising:
   using the processor module, selecting a merchant offer; and
   using the transmitter module, transmitting the merchant offer to the point of sale platform.

4. The method of claim 3 wherein the selecting comprises applying a transaction fee offer rule to the transaction fee information.

5. The method of claim 1 further comprising, when the transaction data object corresponds to a transaction initiated with a first purchasing instrument, identifying, using the processor module, a second purchasing instrument that corresponds to the customer.

6. The method of claim 5 further comprising transmitting to the customer, using the transmitter, second purchasing instrument information that corresponds to the second purchasing instrument.

7. The method of claim 5 wherein the second purchasing instrument information comprises:
   an issuer identifier; and
   a network identifier.

8. One or more computer-readable media storing computer-executable instructions which, when executed by a processor on a computer system, perform a method for providing transaction fee information to a customer, the method comprising:
   receiving a transaction data object from a point of sale ("POS") interactive device;
   identifying a transaction fee based on the transaction data object; and
   transmitting to the POS a transaction fee data object that comprises the transaction fee information.

9. The media of claim 8 wherein the method further comprises, when the transaction data object is a first transaction data object, receiving from the POS interactive device a second transaction data object, the second transaction data object including a transaction fee selection.

10. The media of claim 8 wherein the method further comprises:
    selecting a merchant offer; and
    transmitting the merchant offer to the POS interactive device.

11. The media of claim 10 wherein, in the method, the selecting comprises applying a transaction fee offer rule to transaction fee information.

12. The media of claim 8 wherein, when the transaction data object corresponds to a transaction initiated with a first purchasing instrument, the method further comprises identifying a second purchasing instrument that corresponds to the customer.

13. The media of claim 12 wherein the method further comprises transmitting to the customer second purchasing instrument information that corresponds to the second purchasing instrument.

14. The media of claim 13 wherein, in the method, the second purchasing instrument information comprises:
    an issuer identifier; and
    a network identifier.

* * * * *